United States Patent [19]
Gu

[11] Patent Number: 5,875,320
[45] Date of Patent: Feb. 23, 1999

[54] SYSTEM AND METHOD FOR SYNCHRONIZING PLURAL PROCESSOR CLOCKS IN A MULTIPROCESSOR SYSTEM

[75] Inventor: Weiming Gu, Austin, Tex.

[73] Assignee: International Business Machines Corporation, Armonk, N.Y.

[21] Appl. No.: 822,022

[22] Filed: Mar. 24, 1997

[51] Int. Cl.[6] .................................................. G06F 1/12
[52] U.S. Cl. ............................................................. 395/553
[58] Field of Search ............................... 395/553, 200.78

[56] References Cited

U.S. PATENT DOCUMENTS

| | | | |
|---|---|---|---|
| 4,746,920 | 5/1988 | Nellen et al. | 340/825.14 |
| 4,882,739 | 11/1989 | Potash et al. . | |
| 5,041,966 | 8/1991 | Nakai et al. | 395/553 |
| 5,146,585 | 9/1992 | Smith, III . | |
| 5,371,896 | 12/1994 | Gove et al. . | |
| 5,408,506 | 4/1995 | Mincher et al. . | |
| 5,448,732 | 9/1995 | Matsumoto . | |
| 5,450,573 | 9/1995 | Gronemeyer . | |
| 5,495,615 | 2/1996 | Nizar et al. . | |
| 5,504,927 | 4/1996 | Okamoto et al. . | |

OTHER PUBLICATIONS

"Synchronization of Multi–Media Digital Signal Processor with Integrated Services Digital Network Timing," *IBM Technical Disclosure Bulletin*, vol. 37, No. 9, Sep. 1994, pp. 9–11.

*Primary Examiner*—Thomas M. Heckler
*Attorney, Agent, or Firm*—Leslie A. Van Leeuwen; Jeffrey S. LaBaw; George E. Clark

[57] ABSTRACT

The system and method of the present invention allows synchronization of processor clocks in a multiprocessor information handling system. The present invention calculates an average processor clock value for each processor being synchronized. All processors being synchronized read their clocks a predetermined number of times. The clock reading is done simultaneously by all the processors being synchronized. Each processor then calculates an average processor clock value, which is equivalent, for synchronization purposes, to the average processor clock values of the other processors. When more than two processors are being synchronized, a processor may be chosen as the primary processor. The other, secondary processors are synchronized one at a time with the primary processor. An adjustment is then made to the average processor clock values obtained, so that all average processor clock values are based on the same average processor clock value of the primary processor. Processor clocks in multiprocessor information handling systems may be efficiently synchronized within a small number of clock cycles. The synchronization may be accurately performed on any number of processors in a multiprocessor information handling system.

18 Claims, 4 Drawing Sheets

SYSTEM AND METHOD FOR SYNCHRONIZING PLURAL PROCESSOR CLOCKS IN A MULTIPROCESSOR SYSTEM

BACKGROUND OF THE INVENTION

1. Field of the Invention

The present invention relates to information handling systems and, more particularly, to systems and methods for synchronizing processor clocks in a multiprocessor information handling system.

2. Prior Art

In multiprocessor information handling systems, there are many circumstances where processor clocks must be synchronized to perform certain system functions, such as sharing performance information among the multiple processors in the information handling system.

Typically, there is no means provided at the hardware level of an information handling system to provide for clock synchronization. Therefore, the operating system must provide for synchronization for its own processes, which may require the generation of a system clock signal.

Although a general system clock may be adequate for limited applications in the information handling system, it is not adequate for performance measurement purposes. For example, the system clock does not provide sufficient granularity for small (subcycle) variations between processors in the system. Further, the system clock requires a considerable amount of system resources which would adversely affect performance of a system if the system clock were continually referred to during performance measurement. This would further skew the performance results. Although there have been attempts to reduce the amount of system resources for clock generation on some recently developed processor integrated circuit chips, there is still no means provided at the hardware level to synchronize or calibrate the times of the various clock signals for the plural processors in the information handling system to a single value for the entire information handling system.

There are several prior art approaches to synchronization. However, most prior art approaches focus on synchronization of either data or software processes. For example, some prior art approaches provide methods for synchronizing data between external apparatus and processors. This type of data synchronization does not provide the granularity needed when measuring performance in a multiprocessor information handling system.

Other prior art approaches use interrupts to synchronize software processes executing on multiple processors within a system. For example, there may be many processes executing in the system, each process executing on a separate processor. It is even possible for each process to be executing in a separate processor in a separate system. As each process reaches a "synchronization point," the process stops, asserts an interrupt, and transmits a "synchronous-readiness" signal to all other processors. When all processors have generated a synchronous-readiness signal, all processors are then resumed. Although this prior art approach allows for synchronization across several software processes, it does not provide for synchronization of multiple clocks in a multiprocessor information handling system. Furthermore, this type of prior art approach would adversely impact any performance measurements, as the very act of interrupting the system would impact system performance.

Consequently, it would be desirable to have a system and method of accurately and efficiently synchronizing processor clocks in a multiprocessor information handling system. It would be desirable to have a system and method which provide sufficient granularity for subcycle variations between processors in the information handling system, while using a relatively small amount of system resources.

SUMMARY OF THE INVENTION

To meet the needs expressed above, a system and method for synchronizing processor clocks in a multiprocessor information handling system includes a number of processing elements, each having its own internal clock, one or more images of an operating system for controlling the operation of the processors, a memory system for storing data and instructions to be used by the processors, an input/output system for communicating information to and from peripheral devices, and at least one system bus connecting the elements of the system for efficient operation.

A method for synchronizing the processor clocks in two or more processors includes the step of calculating an average processor clock value for each processor being synchronized. All processors being synchronized read their clocks a predetermined number of times. The clock reading is done simultaneously by all the processors being synchronized. Each processor then calculates an average processor clock value, which is equivalent, for synchronization purposes, to the average processor clock values of the other processors.

When more than two processors are being synchronized, a processor may be chosen as the primary processor. The other, secondary processors are synchronized one at a time with the primary processor. An adjustment is then made to the average processor clock values obtained, so that all average processor clock values are based on the same average processor clock value of the primary processor.

It is an advantage of the present invention that processor clocks in multiprocessor information handling systems may be efficiently synchronized within a small number of clock cycles. It is a further advantage of the present invention that the synchronization may be accurately performed on any number of processors in a multiprocessor information handling system.

Other features and advantages of the invention, and a more complete understanding of the invention may be had by referring to the following description taken in conjunction with the accompanying drawings.

DETAILED DESCRIPTION OF A PREFERRED EMBODIMENT OF THE INVENTION

Figure 1:
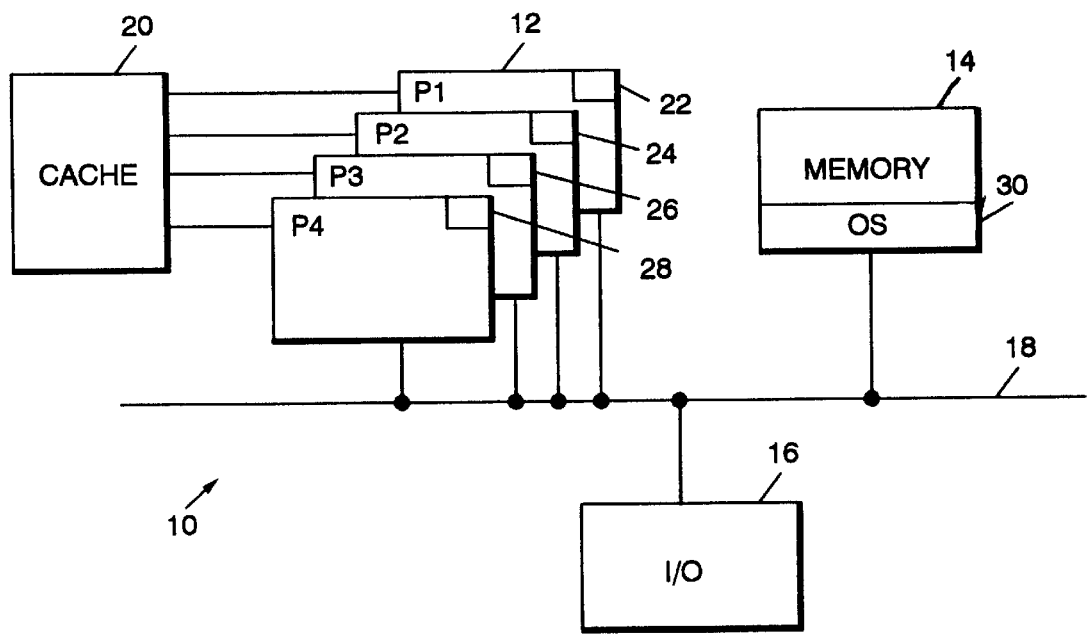
FIG. 1 is a block diagram of an information handling system implementing the present invention.

Referring now to FIG. 1, a multiprocessor information handling system in accordance with the present invention will be described. Information handling system 10 includes a plurality of processors 12. In the described embodiment, four processors 12 labeled P1, P2, P3, and P4 are included. Each of processors 12 is connected to memory 14 and I/O system 16 by system bus 18. Each of processors 12 may also be connected to cache 20, which may be either dedicated cache or shared cache, depending upon system requirements. The arrangement of memory system 14, I/O system 16, and cache 20 is not critical to the present invention and may be implemented in any number of well-known designs.

Each processor 12 includes an internal clock, represented as clock 22 in P1, clock 24 in P2, clock 26 in P3, and clock 28 in P4. Memory system 14 also includes one or more images of operating system 30 which controls the operation of information handling system 10. Operating system 30 may be any one of a number of well-known operating systems, such as the IBM OS/2 operating system.

Note that a multiprocessor information handling system with n processors, where n is the number of processors, is also referred to as an n-way multiprocessor system. Almost all of today's multiprocessor systems support "atomic" memory access operations. A memory operation is said to be "atomic" if the result of the operation is seen as a whole by any processor in the information handling system. As an example, if a shared memory variable, with an initial value of 100, is incremented by 10, the value of the shared variable is seen by any processor in the system as either 100 or 110, rather than as any other number. The present invention is preferably implemented on a system that supports atomic memory access operations, and in the following description, it is assumed that the system supports atomic memory access operations.

Figure 2:
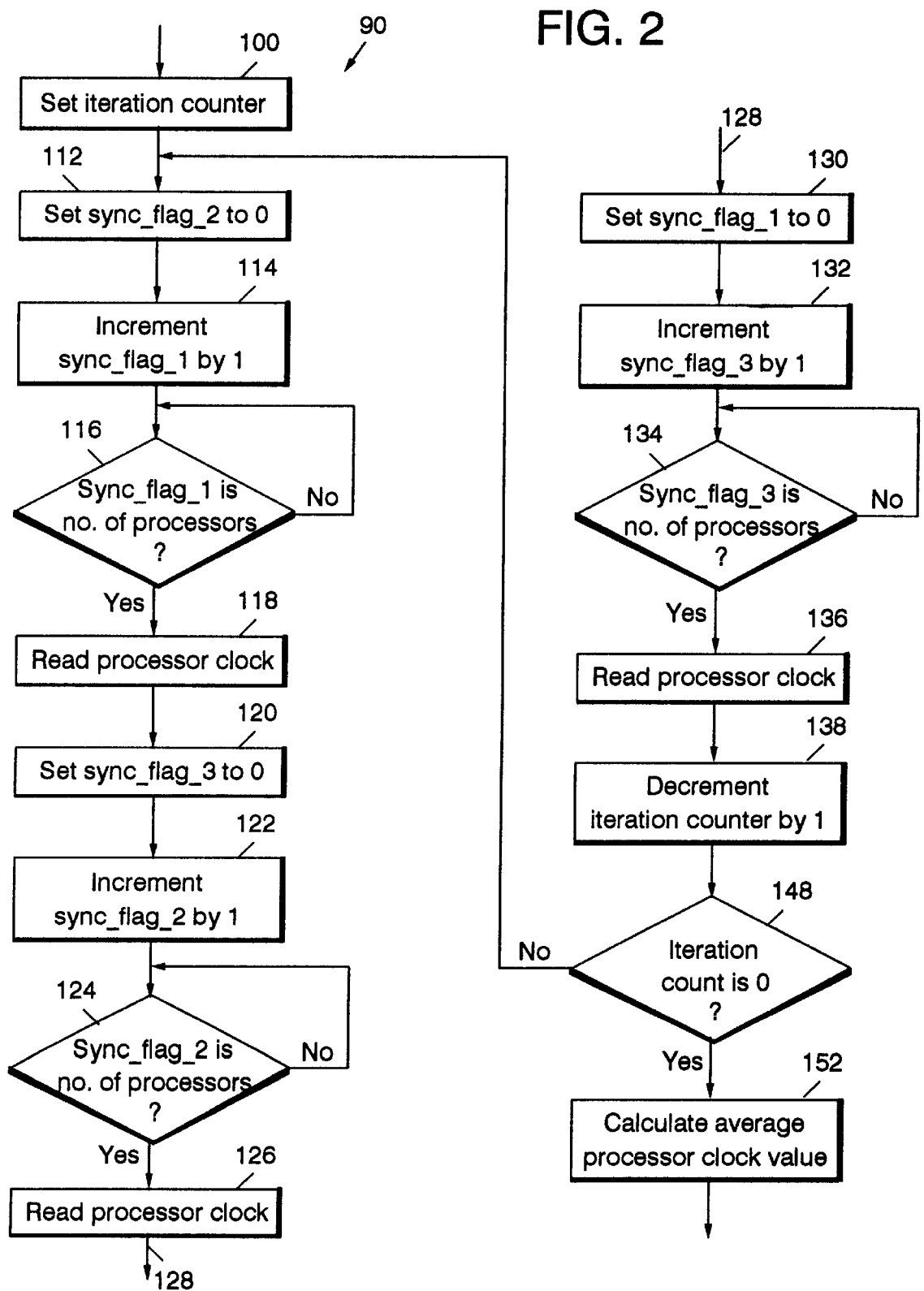
FIG. 2 is a flowchart illustrating a method for synchronizing two or more processor clocks in accordance with the present invention.

Referring now to FIG. 2, a process for synchronizing a clock in one processor to a clock in another processor will be described. Note that while FIG. 2 is described with reference to synchronizing two processor clocks, the use of two processors is not meant to be limiting. The method depicted in FIG. 2 may be used to synchronize more than two processor clocks. However, as described below with reference to FIG. 3, a more sophisticated method (depicted in FIG. 3), which uses the method depicted in FIG. 2 as a basic building block, is preferably used when synchronizing more than two processor clocks.

The method depicted in FIG. 2 uses flags stored in shared memory, referred to as "sync flags," to build a barrier at which each processor waits until all processors reach the barrier. Once the barrier is reached by all processors, each processor proceeds to read its processor clock. Note that interrupts are disabled before each processor enters the process depicted in FIG. 2, and interrupts are not enabled until the process in FIG. 2 completes.

Still referring to FIG. 2, the process for synchronizing two processor clocks will be described. For illustrative purposes, assume that processors P1 and P2 are to be synchronized. Note that in the described embodiment, the sync flags and counters are stored by operating system 30 in memory 14. All sync flags are shared by the processors being synchronized, i.e. all processors may access the sync flags in memory 14, while the iteration counter and the clock readings are local to each processor. It is important to note that all processors which are being synchronized perform the same steps. In FIG. 2, this means that both processors P1 and P2 perform the steps depicted in FIG. 2. Operating system 30 sets the initial value of sync_flag_1 to zero, and then starts the process depicted in FIG. 2 on one processor, and then on the other processor. Note that sync_flag_1 must be set to zero before the process starts on either processor, while the order in which the processors start the clock synchronization process is not important. The processors will proceed synchronously after the first barrier is reached at step 116 (described below).

The basic synchronization method 90 depicted in FIG. 2 requires that shared variable sync_flag_1 must be set to zero before the process begins. After the shared variable sync_flag_1 is set to zero, an iteration counter is set to a high number, such as 128 or 256 (step 100). Next, another shared variable, sync_flag_2, is set to zero (step 112). Sync_flag_1 is incremented by one (step 114), and sync_flag_1 is tested to determine if the value of sync_flag_1 is equal to the number of processors being synchronized (step 116). If not, the process loops on step 116 until sync_flag_1 is equal to the number of processors being synchronized, and then the processor clock is read (step 118). In this case, neither processor will proceed to step 118 until both processors have incremented sync_flag_1. In other words, each processor increments sync_flag_1 (step 116) and then waits. Once each processor has incremented sync_flag_1, sync_flag_1 will be equal to the number of processors being synchronized, i.e. in this example, sync_flag_1 will be equal to two. Thus, the test in step 116 will be true. This will cause both processors to read their respective internal clocks (step 118). Both processors should execute step 118 simultaneously, or nearly simultaneously. Note that the on-chip clock on each processor is also referred to as a cycle counter. The cycle counter typically runs at the speed of the processor. For example, in a 100 MHZ processor, the cycle counter counts 100 million cycles, also referred to as ticks, per second. The number read in step 118 is referred to as a cycle count, or as a number of ticks. After reading the processor clock in step 118, each processor stores the value read.

Because each processor waits on the condition in step 116, the two processors see the sync flag equal to two at approximately the same time. Therefore, the subsequent reading of processor clocks in step 118 also occurs at approximately the same time. The difference in time between the first and the last processor seeing the sync flag become equal to two is the error margin of this clock synchronization process. To reduce the error margin, the synchronization process is repeated multiple times. Thus, the error margin of the resulting clock readings can be reduced to within a few clock ticks. However, the above described clock synchronization process can not simply be repeated over and over, because the sync flag must be set back to zero before the process starts again. In a decentralized multiprocessor system, where processors operate independently of one another, care must be taken to ensure that the sync flag is read and written by each processor properly. If the above clock synchronization process is repeated with a single sync flag, and the flag is set to zero at the end of each iteration, the sync flag may be set to zero by one processor at the end of an iteration, while another processor may have already advanced to the next iteration and have incremented the sync flag by one. A deadlock in the process will occur as the sync flag will never reach the number of processors participating in the synchronization process.

The problem can be avoided by using three separate sync flags, and invoking the process three times, as shown in FIG. 2. This three-flag process can then be repeated multiple times. Steps 112 through 118 are repeated two more times in steps 120 through 126 and steps 130 through 136, using sync_flag_2 and sync_flag_3 as barriers, respectively. It is important to note that sync_flag_2 is guaranteed to be equal to zero after step 116 is executed and before step 120 is started. Similarly, the value of sync_flag_3 is guaranteed to be equal to zero after step 124 is executed and before step 130 is started. Finally, the value of sync_flag_1 is guaranteed to be equal to zero before the next iteration starts at step 112.

The method depicted in FIG. 2 thus continues as follows. Sync_flag_3 is set to zero (step 120). Sync_flag_2 is incremented by one (step 122), and a test is made to determine if sync_flag_2 is equal to the number of processors having their clocks synchronized (step 124). If the test is negative, the process loops on step 124 until the test is positive. When sync_flag_2 is equal to the number of processors, the processor clock is read (step 126). Next, sync_flag_1 is set to zero (step 130). Sync_flag_3 is incremented by one (step 132), and a test is made to determine if sync_flag_3 is equal to the number of processors (step 134). If the answer is negative, the process loops on step 134 until sync_flag_3 is equal to the number of processors. When the test is positive, the processor clock is read (step 136).

After steps 112 through 136 have been completed, the iteration counter is decremented by one (step 138). A test is made to determine if the iteration count is zero (step 148). If the iteration count is zero, the average processor clock value is calculated (step 152), and synchronization of the two processor clocks is complete. If the iteration count is not equal to zero, the process returns to step 112 and continues until the iteration count reaches zero, and the process is complete through step 152. The total number of times each processor reads its clock is the number of iterations multiplied by three (clocks are read three times per iteration). The resulting synchronized clock values are calculated (in step 152) by averaging the clock readings from multiple invocations of the clock synchronization process on each processor. For example, suppose that each processor, P1 and P2, has four clock readings. If the clock readings of processor P1 are 10, 19, 31, and 40, and those of processor P2 are 110, 121, 129, and 140, the calculated average clock readings for processors P1 and P2 are 25 and 125, respectively. In other words, when the clock on processor P1 is at 25, the clock on processor P2 is at 125.

While the method depicted in FIG. 2 may be used for synchronizing any number of processor clocks, the results become less accurate as more processor clocks are synchronized. The error margin of the process, dictated by the time difference between the first and the last processor reaching the barrier (steps 116, 124, and 134), becomes larger as more processors are present in the system. This is due to more intensive contention for shared memory access on these systems. To increase accuracy on systems with more than two processors, a more sophisticated method, as depicted in FIG. 3, may be used.

Figure 3:
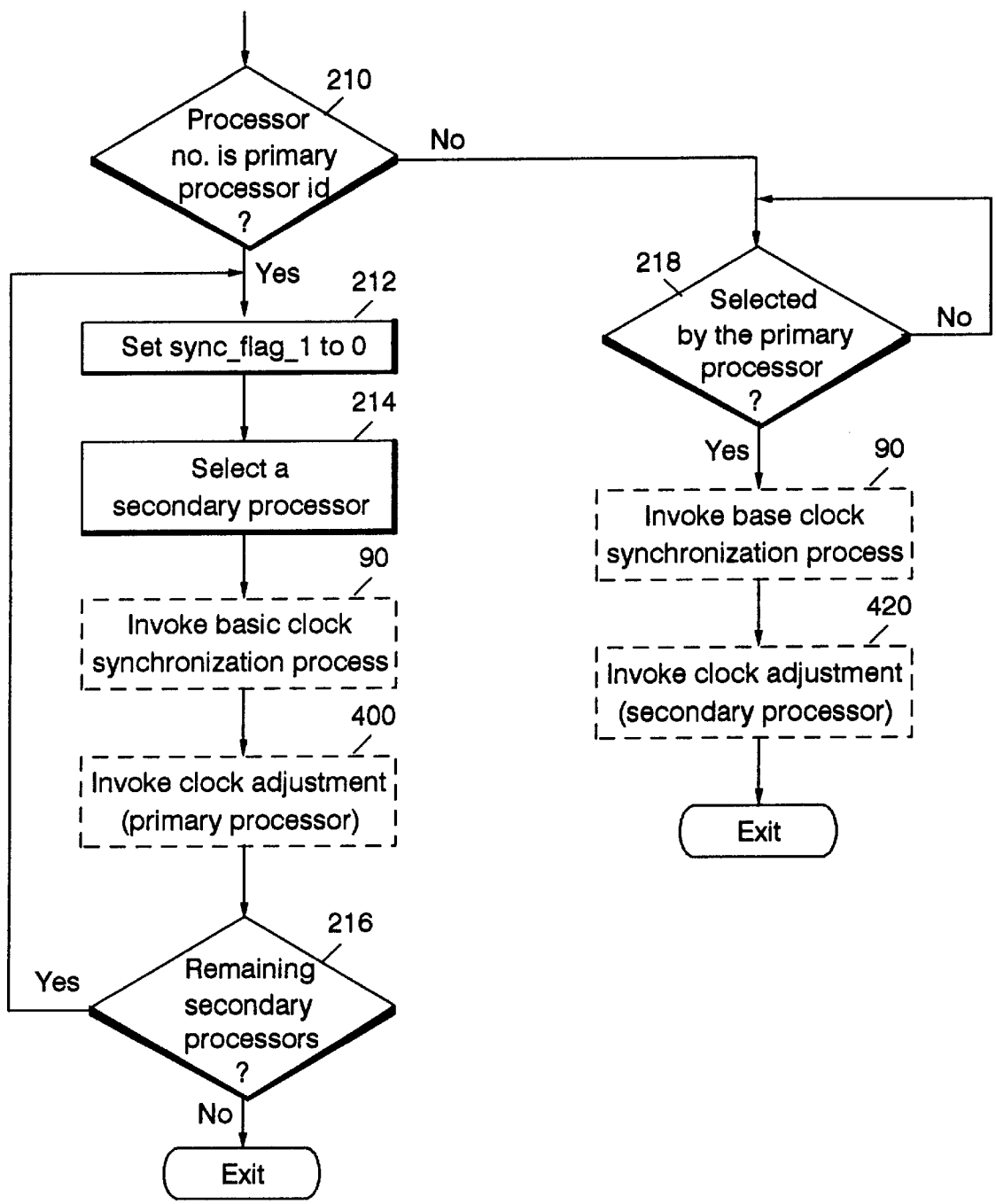
FIG. 3 is a flowchart showing the clock synchronization method in accordance with the present invention for an information handling system with three or more clocks to be synchronized.

Referring now to FIG. 3, in those multiprocessor system where there are more than two processors, one processor is designated as the primary processor and the rest are secondary processors. Note that any one of the processors may be chosen as the primary processor. Each secondary processor synchronizes with the primary processor by invoking the basic synchronization method as described above with reference to FIG. 2. Because the secondary processors synchronize with the primary processor at different times (i.e. one secondary processor at a time synchronizes with the primary processor), the results must be adjusted, as shown below with reference to FIG. 4.

Referring again to FIG. 3, in those systems where more than one secondary processor clock is to be synchronized with a primary processor clock, the following process is employed. Note that all processors must start the process at step 210, and the identity of each processor is determined by its processor number, which is unique in a given multiprocessor system. Typically, processors in a multiprocessor system are numbered from 0 to the number of processors less one. At step 210, a test is made to determine whether the current processor is the primary processor or a secondary processor by testing the processor number against the primary processor identification number. If the processor number equals the primary processor identification number, steps 212, 214, 90, 400, and 216 are executed. If the processor number is not equal to the primary processor identification number, steps 218, 90, and 420 are executed in the secondary processor.

Assuming a primary processor identification is determined in step 210, sync_flag_1 is set to zero (step 212). A secondary processor is selected (step 214), and the basic clock synchronization process 90, as described above with reference to FIG. 2, is executed. Next, the clock adjustment process for the primary processor is executed (step 400). This step is described more fully below, with reference to FIG. 4.

A test is made to determine if there are any remaining secondary processors (step 216). If yes, the process returns to step 212 and continues until all remaining secondary processors have been synchronized, at which time the process is exited.

If the current processor number is not a primary processor identification number, the right branch of the flow chart as shown in FIG. 3 is taken. First, a test is made to determine whether the current processor is selected by the primary processor (step 218). If not, the process loops until the current processor is the selected secondary processor. When the test in step 218 is satisfied, the base clock synchronization process 90 is invoked as described above with reference to FIG. 2, and the secondary processor clock adjustment process is invoked (step 420) as described below with reference to FIG. 4. After the clock adjustment process has been completed, the synchronization process is exited.

Figure 4:
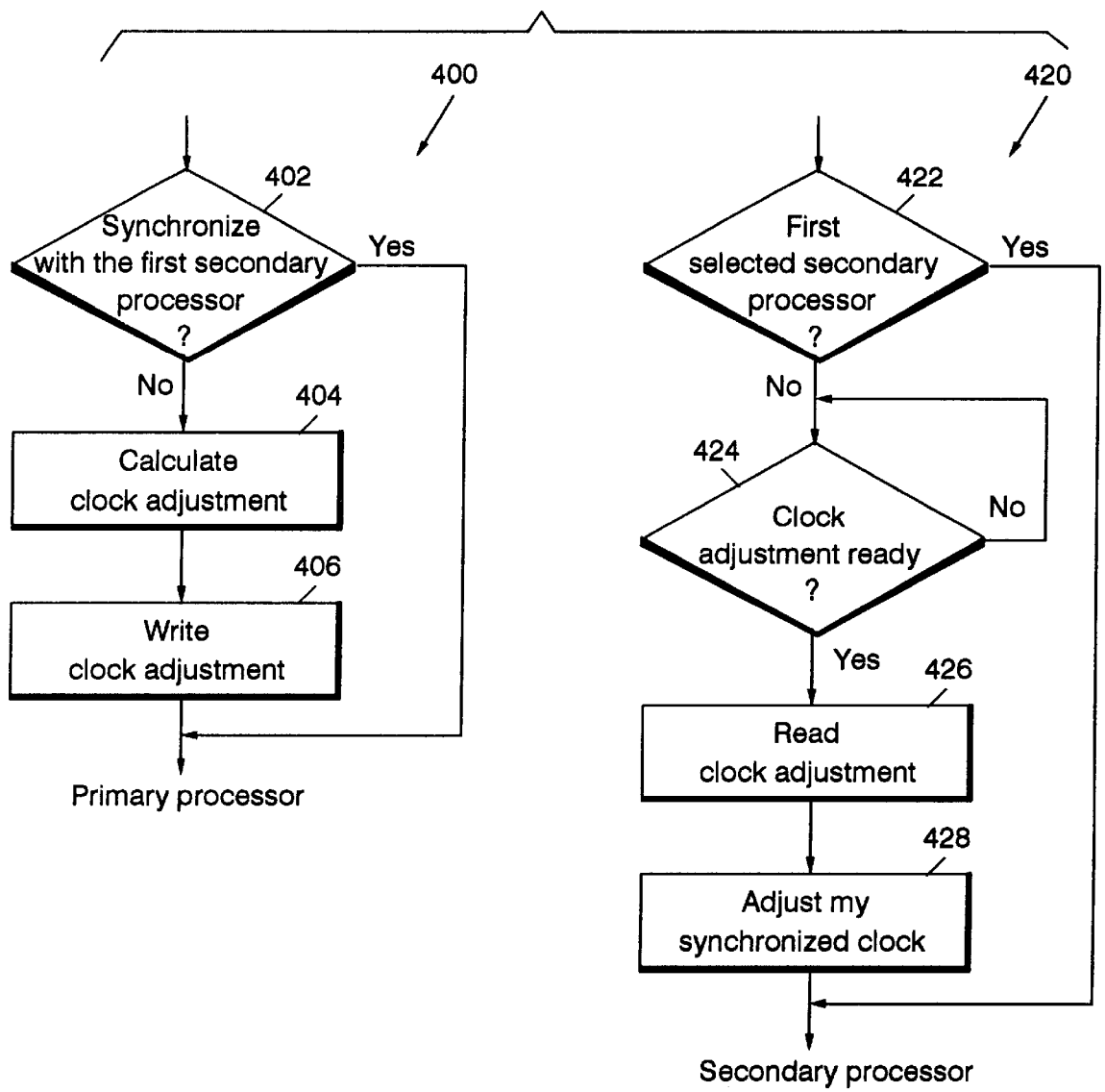
FIG. 4 is a flowchart showing details of clock adjustment in accordance with the present invention.

FIG. 4 is a flowchart illustrating the details of the clock adjustment process. Because all secondary processors synchronize with the primary processor, the primary processor is able to calculate the difference in time between when it synchronizes with the first secondary processor and when it synchronizes with the second, and subsequent, secondary processors. This difference is used, for example, by the second secondary processor (i.e. P3) to adjust its synchronized clock to the time when the primary processor (i.e. P1) synchronized with the first secondary processor (i.e. P2). The remaining secondary processors are similarly adjusted.

Referring now to FIG. 4, the clock adjustment process will be described. The purpose of the clock adjustment process is to relate all average processor clock values to a base average processor clock value, i.e. the average processor clock value of primary processor P1. The clock adjustment process 400 for the primary processor (P1) first tests to determine whether the primary processor is to be synchronized with the first secondary processor (step 402). If yes, the process immediately exits. The reason that step 402 exits process 400 if the test is positive is that the primary processor and the first secondary processor have been previously synchronized, and a clock adjustment value established as a base point for adjustment of clocks of other secondary processors to the primary processor. If the primary processor is to be synchronized with any secondary processor other than the first secondary processor, a clock adjustment is calculated (step 404). The clock adjustment is the difference between the average processor clock value of the primary processor when it is synchronized with the first secondary processor and the average processor clock value of the primary processor when it is synchronized with the current processor. The clock adjustment value is then written to a register for storing the clock adjustment value (step 406).

The clock adjustment process 420 in each secondary processor first tests to determine if the selected secondary processor is the first secondary processor (step 422). If true, the clock adjustment process is exited for the reason stated above. If false, a test is made to determine if a clock adjustment value is ready (step 424). If not, the process loops on step 424 until the clock adjustment value is ready. The clock adjustment value is ready when the primary processor has finished calculating it (in step 404) and has stored it in a known shared memory location, where it can then be read by the secondary processor. When the clock adjustment value is ready, the clock adjustment value is read (step 426), and the synchronized clock value of the selected secondary processor is adjusted (step 428) as is shown with respect to FIG. 5.

Figure 5:
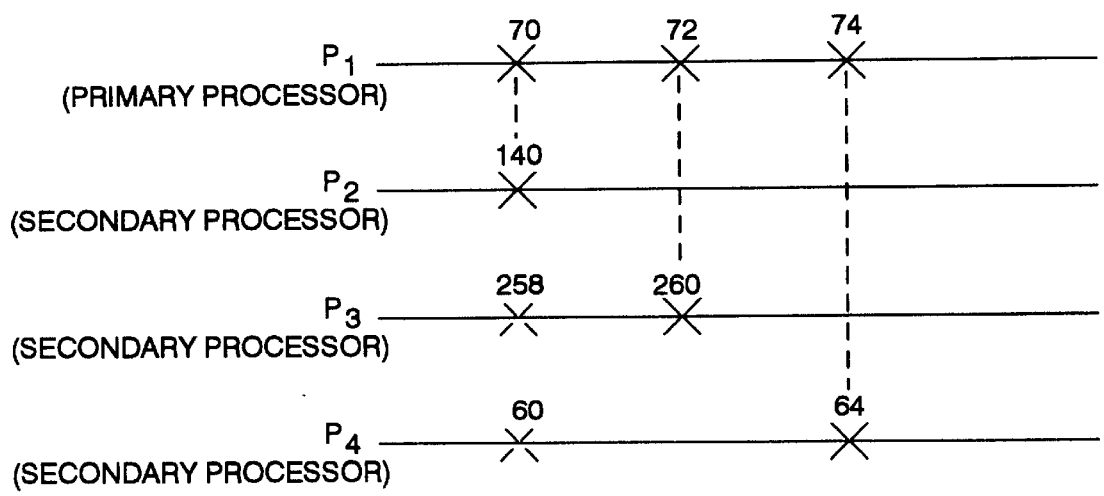
FIG. 5 is a timing chart showing the timing of synchronization of processor clocks in an exemplary multiprocessor information handling system in accordance with the present invention.

Referring now to FIG. 5, an example of adjustment of the synchronized clocks for a four-processor system having a primary processor P1 and secondary processors P2, P3, and P4 will be described. After processors P1 and P2 are synchronized, the clock values may be 70 and 140, respectively. This means that a value of 70 in P1 is equivalent to a value of 140 in P2. To complete synchronization of all processors, it is desirable to determine equivalent values for P3 and P4. In other words, we know that a value of 70 in P1 is equivalent to a value of 140 in P2. Now we want to determine values for P3 and P4 which also are equivalent to a value of 70 in P1 and a value of 140 in P2. This is accomplished in the following manner. When the processors P1 and P3 are synchronized, the clock values are 72 and 260, respectively. Processor P1, the primary processor, calculates the clock adjustment (72 minus 70, or 2), and sends the adjustment (−2) to processor P3. Processor P3 then adjusts its synchronized clock reading from 260 to 258 by applying the clock adjustment, −2. Thus, a value of 258 in P3 is equivalent to a value of 70 in P1 and a value of 140 in P2. Similarly, processor P4 adjusts its synchronized clock reading to 60 by applying the clock adjustment value (74 minus 70) to the P4 clock reading of 64 to obtain an adjusted clock value for secondary processor P4 of 60. Thus, at some synchronized time point, where the primary processor P1 clock value is 70, secondary processors P2, P3, and P4 have clock values of 140, 258, and 60, respectively. Thus, all secondary processors are referenced to the synchronized clock of the primary processor P1.

Once all four processors are synchronized, the synchronization data can be used for many purposes, including, but not limited to, performance measurement and analysis. As an example, suppose that a performance tool obtains the following system events regarding locks in the various processors in the information handling system. Locks are used extensively in multiprocessor systems to synchronize accesses to shared resources. Typically, a processor acquires a lock before using a system resource and releases the lock after finishing using it.

| Event | Time |
|---|---|
| P1: | |
| Acquire lock | 80 |
| Release lock | 90 |
| Acquire lock | 102 |
| Release lock | 118 |
| P2: | |
| Acquire lock | 162 |
| Release lock | 170 |
| P3: | |
| Acquire lock | 328 |
| Release lock | 348 |
| P4: | |
| Acquire lock | 110 |
| Release lock | 120 |

In order to understand the performance behavior of the system, it is often desirable to know the exact order in which these locks are acquired and released in the system. Given the synchronization data in FIG. 5, it is a simple task to calculate the order in which the above events actually occurred.

The first step is to determine the equivalent P1 execution time of each lock activity event:

| Event | Time | Equivalent P1 Time |
|---|---|---|
| P1: | | |
| Acquire lock | 80 | 80 |
| Release lock | 90 | 90 |
| Acquire lock | 102 | 102 |
| Release lock | 118 | 118 |
| P2: | | |
| Acquire lock | 162 | 92 |
| Release lock | 170 | 100 |
| P3: | | |
| Acquire lock | 328 | 140 |
| Release lock | 348 | 160 |
| P4: | | |
| Acquire lock | 110 | 120 |
| Release lock | 120 | 130 |

Once the equivalent P1 execution times are determined, the events can be ordered in the actual order in which they occurred, and it is possible to obtain a global picture of how the lock is used in the system.

| P1 | P2 | P3 | P4 | Equivalent P1 Time |
|---|---|---|---|---|
| Acquire | | | | 80 |
| Release | | | | 90 |
| | Acquire | | | 92 |
| | Release | | | 100 |
| Acquire | | | | 102 |
| Release | | | | 118 |
| | | | Acquire | 120 |
| | | | Release | 130 |
| | | Acquire | | 140 |
| | | Release | | 160 |

Although the invention has been described with a certain degree of particularity, it should be recognized that elements thereof may be altered by persons skilled in the art without departing from the spirit and scope of the invention. One of the preferred implementations of the invention is as sets of instructions resident in the memory 14 of one or more computer systems configured generally as described in FIG. 1. Until required by the computer system, the set of instructions may be stored in another computer readable memory, for example in a hard disk drive, or in a removable memory such as an optical disk for eventual use in a CD-ROM drive or a floppy disk for eventual use in a floppy disk drive. Further, the set of instructions can be stored in the memory of another computer and transmitted over a local area network or a wide area network, such as the Internet, when desired by the user. One skilled in the art would appreciate that the physical storage of the sets of instructions physically changes the medium upon which it is stored electrically, magnetically, or chemically so that the medium carries computer readable information. The invention is limited only by the following claims and their equivalents.

What is claimed is:

1. An information handling system, comprising;
   a plurality of processors, each processor containing an internal clock;
   a memory system for storing instructions and data for use by said processors;
   one or more images of an operating system for controlling the operation of said processors; and
   means for synchronizing a first clock, internal to a first processor, with a second clock, internal to a second processor, wherein said means for synchronizing the first clock with the second clock includes:
      means for reading the first clock and the second clock a first predetermined number of times, at substantially simultaneous times, to obtain a plurality of first clock values and a plurality of second clock values;
      means for averaging the first clock values to obtain a first average processor clock value for the first clock; and
      means for averaging the second clock values to obtain a second average processor clock value for the second clock;
      wherein the first average processor clock value and the second average processor clock value are synchronized with each other.

2. An information handling system according to claim 1, wherein said means for reading comprises:
   means for setting a synchronization flag to a first value;
   means for monitoring the synchronization flag by the first processor and the second processor;
   means for reading the first clock, by the first processor, when the synchronization flag is set to a predetermined value; and
   means for reading the second clock, by the second processor, when the synchronization flag is set to the predetermined value;
   wherein the first clock and the second clock are read at substantially the same time.

3. An information handling system according to claim 2, wherein said means for setting a synchronization flag to a first value comprises means for setting the synchronization flag to zero.

4. An information handling system according to claim 2, further comprising means for incrementing the synchronization flag by the first processor and the second processor.

5. An information handling system according to claim 1, wherein said means for synchronizing further comprises means for synchronizing the first clock, internal to the first processor, with a third clock, internal to a third processor, wherein said means for synchronizing the first clock with the third clock comprises:
   means for reading the first clock and the third clock a second predetermined number of times, at substantially simultaneous times, to obtain a plurality of new first clock values and a plurality of third clock values;
   means for averaging the new first clock values to obtain a new first average processor clock value for the first clock; and
   means for averaging the third clock values to obtain a third average processor clock value for the third clock;
   wherein the new first average processor clock value and the third average processor clock value are synchronized with each other.

6. An information handling system according to claim 5, further comprising means for synchronizing the second clock with the third clock, wherein said means for synchronizing the second clock with the third clock includes:
   means for calculating a clock adjustment value, wherein the clock adjustment value is a difference between the first average processor clock value and the new first average processor clock value; and
   means for subtracting the clock adjustment value from the third average processor clock value to obtain a new third average processor clock value;
   wherein the first average processor clock value, the second average processor clock value, and the new third average processor clock value are synchronized with each other.

7. A method for synchronizing a first processor clock, internal to a first processor, with a second processor clock, internal to a second processor, comprising the steps of:
   reading the first processor clock and the second processor clock a first predetermined number of times, at substantially simultaneous times, to obtain a plurality of first clock values and a plurality of second clock values;
   averaging the first clock values to obtain a first average processor clock value for the first clock; and
   averaging the second clock values to obtain a second average processor clock value for the second clock;
   wherein the first average processor clock value and the second average processor clock value are synchronized with each other.

8. A method according to claim 7, wherein said reading step comprises the steps of:
   setting a synchronization flag to a first value;
   monitoring the synchronization flag by the first processor and the second processor;
   reading the first clock, by the first processor, when the synchronization flag is set to a predetermined value; and
   reading the second clock, by the second processor, when the synchronization flag is set to the predetermined value;
   wherein the first clock and the second clock are read at substantially the same time.

9. A method according to claim 8, wherein said step of setting a synchronization flag to a first value comprises the step of setting the synchronization flag to zero.

10. A method according to claim 8, further comprising the step of incrementing the synchronization flag by the first processor and the second processor.

11. A method according to claim 7, further comprising the step of synchronizing the first clock, internal to the first processor, with a third clock, internal to a third processor, wherein said step of synchronizing the first clock with the third clock comprises the steps of:

reading the first clock and the third clock a second predetermined number of times, at substantially simultaneous times, to obtain a plurality of new first clock values and a plurality of third clock values;

averaging the new first clock values to obtain a new first average processor clock value for the first clock; and averaging the third clock values to obtain a third average processor clock value for the third clock;

wherein the new first average processor clock value and the third average processor clock value are synchronized with each other.

12. A method according to claim 11, further comprising the step of synchronizing the second clock with the third clock, wherein said step of synchronizing the second clock with the third clock comprises the steps of;

calculating a clock adjustment value, wherein the clock adjustment value is a difference between the first average processor clock value and the new first average processor clock value; and subtracting the clock adjustment value from the third average processor clock value to obtain a new third average processor clock value;

wherein the first average processor clock value, the second average processor clock value, and the new third average processor clock value are synchronized with each other.

13. A computer readable medium, comprising:

means for synchronizing a first clock, internal to a first processor, with a second clock, internal to a second processor, wherein said means for synchronizing the first clock with the second clock includes:

means for reading the first clock and the second clock a first predetermined number of times, at substantially simultaneous times, to obtain a plurality of first clock values and a plurality of second clock values;

means for averaging the first clock values to obtain a first average processor clock value for the first clock; and means for averaging the second clock values to obtain a second average processor clock value for the second clock;

wherein the first average processor clock value and the second average processor clock value are synchronized with each other.

14. A computer readable medium according to claim 13, wherein said means for reading comprises:

means for setting a synchronization flag to a first value;

means for monitoring the synchronization flag by the first processor and the second processor;

means for reading the first clock, by the first processor, when the synchronization flag is set to a predetermined value; and means for reading the second clock, by the second processor, when the synchronization flag is set to the predetermined value;

wherein the first clock and the second clock are read at substantially the same time.

15. A computer readable medium according to claim 14, wherein said means for setting a synchronization flag to a first value comprises means for setting the synchronization flag to zero.

16. A computer readable medium according to claim 14, further comprising means for incrementing the synchronization flag by the first processor and the second processor.

17. A computer readable medium according to claim 13, further comprising means for synchronizing the first clock, internal to the first processor, with a third clock, internal to a third processor wherein said means for synchronizing the first clock with the third clock includes:

means for reading the first clock and the third clock a second predetermined number of times, at substantially simultaneous times, to obtain a plurality of new first clock values and a plurality of third clock values;

means for averaging the new first clock values to obtain a new first average processor clock value for the first clock; and means for averaging the third clock values to obtain a third average processor clock value for the third clock;

wherein the new first average processor clock value and the third average processor clock value are synchronized with each other.

18. A computer readable medium according to claim 17, further comprising means for synchronizing the second clock with the third clock, wherein said means for synchronizing the second clock with the third clock includes:

means for calculating a clock adjustment value, wherein the clock adjustment value is a difference between the first average processor clock value and the new first average processor clock value; and means for subtracting the clock adjustment value from the third average clock value to obtain a new third average processor clock value;

wherein the first average processor clock value, the second average processor clock value, and the new third average processor clock value are synchronized with each other.

* * * * *